United States Patent
Stanfill et al.

(10) Patent No.: US 11,093,456 B2
(45) Date of Patent: *Aug. 17, 2021

(54) MANAGING COMPUTATIONS FOR HIERARCHICAL ENTITIES

(71) Applicant: Ab Initio Technology LLC, Lexington, MA (US)

(72) Inventors: Craig W. Stanfill, Lincoln, MA (US); Richard Shapiro, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/513,628

(22) Filed: Jul. 16, 2019

(65) Prior Publication Data

US 2020/0073857 A1   Mar. 5, 2020

Related U.S. Application Data (63) Continuation of application No. 14/844,131, filed on Sep. 3, 2015, now Pat. No. 10,360,186.

(Continued)

(51) Int. Cl.
*G06F 16/185* (2019.01)
*G06F 16/83* (2019.01)

(52) U.S. Cl.
CPC .......... *G06F 16/185* (2019.01); *G06F 16/83* (2019.01)

(58) Field of Classification Search
CPC ............................... G06F 16/185; G06F 16/83
See application file for complete search history.

(56) References Cited

U.S. PATENT DOCUMENTS 6,281,899 B1   8/2001   Gould et al.
6,920,608 B1   7/2005   Davis
(Continued)

FOREIGN PATENT DOCUMENTS

JP   2004171261 A   6/2004
JP   2008504601 A   2/2008

OTHER PUBLICATIONS

Reinfelds, J., "Conformable Arrays", CERN, Document No. CERN-DD-82-005, published 1982 <URL: https://cds.cern.ch/record/136478/files/198209243.pdf>.

(Continued)

*Primary Examiner* — Taelor Kim
(74) *Attorney, Agent, or Firm* — Occhiuti & Rohlicek LLP (57) ABSTRACT

Entity data represent entities related according to a hierarchy, with at least one root entity at a highest level and one or more entities at one or more levels below the highest level. One or more entities each have multiple instances, and at least one attribute having respective elements for each of the instances. Input data includes expressions that express functions of arguments, with one or more of the arguments referencing an attribute of an entity represented in the entity data. Processing expressions includes: (a) analyzing an expression to determine, for each of one or more attributes, at least one of: (1) a position in the hierarchy of an entity of the attribute, or (2) a number of elements of a result of a function applied to an argument that references the attribute, and (b) evaluating the expression, or indicating an error based on a result of analyzing the expression.

36 Claims, 4 Drawing Sheets

Related U.S. Application Data (60) Provisional application No. 62/045,108, filed on Sep. 3, 2014.

(56) References Cited

U.S. PATENT DOCUMENTS

| | | | |
|---|---|---|---|
| 7,496,898 | B1 | 2/2009 | Vu |
| 7,650,355 | B1 | 1/2010 | Davis |
| 7,711,739 | B2 | 5/2010 | Schach et al. |
| 7,873,663 | B2 | 1/2011 | Willis et al. |
| 7,979,384 | B2 | 7/2011 | Bozkaya et al. |
| 8,392,460 | B2 | 3/2013 | Hoang et al. |
| 8,577,704 | B2 | 11/2013 | Cannon et al. |
| 9,824,471 | B2 | 11/2017 | Lei et al. |
| 2004/0006574 | A1 | 1/2004 | Witkowski et al. |
| 2004/0133581 | A1 | 7/2004 | Shinjo |
| 2005/0038630 | A1 | 2/2005 | Verschell et al. |
| 2006/0167867 | A1* | 7/2006 | Schach .................. G06F 16/83 |
| 2007/0214157 | A1 | 9/2007 | Kegel et al. |
| 2008/0162693 | A1 | 7/2008 | Kanojia et al. |
| 2008/0208822 | A1* | 8/2008 | Bozkaya ............. G06F 16/3332 |
| 2013/0262406 | A1 | 10/2013 | Kumar et al. |
| 2014/0032617 | A1 | 1/2014 | Stanfill |

OTHER PUBLICATIONS

Hector Garcia-Molina et al: "Database Systems The Complete Book Second Edition—Chapter 12—Programming Languages for XML" In: "Database systems the complete book, second edition", pp. 517-554, Jun. 15, 2008.

Oracle SQL Essential Reference for Professional Engineers, Dec. 10, 2009, pp. 111-113.

Aho et al., "Foundations of Computer Science, C Edition, Chapter 5—The Tree Data Model," Foundations of Computer Science, pp. 223-285, Oct. 15, 1994.

Gottlob et al., "Efficient Algorithms for Processing XPath Queries," ACM Transactions on Database Systems, vol. 30, No. 2, pp. 444-491 Jun. 1, 2005.

Hewlett Packard, "Fortran 90 Compiler for HP-UX— Document No. B3908-90002," Fortran 90 Programmer's Reference, 1st ed., Oct. 1998.

U.S. Appl. No. 14/844,131, filed Sep. 3, 2015.

* cited by examiner

| DATA TYPE | ATTRIBUTE NAME | EXPRESSION |
|---|---|---|
| int | TaxRate | |
| number | TotalTax | sum(PurchAmount * TaxRate) |
| Customer | | |
| string | Custid | |
| int | Discount | |
| string | PostalCode | |
| string | TotalDue | sum(AmountDue) |
| Purchase | | |
| int | Quantity | |
| number | UnitPrice | |
| date | PurchDate | |
| number | PurchAmount | UnitPrice * Quantity |
| number | AmountDue | PurchAmount * (1 − Discount) * (1 + TaxRate) |
| Payment | | |
| number | PayAmount | |
| date | PayDate | |

MANAGING COMPUTATIONS FOR HIERARCHICAL ENTITIES

CROSS-REFERENCE TO RELATED APPLICATIONS

This application is a continuation of U.S. application Ser. No. 14/844,131 (now U.S. Pat. No. 10,360,186), filed Sep. 3, 2015, which claims priority to U.S. Application Ser. No. 62/045,108, filed on Sep. 3, 2014, incorporated herein by reference.

BACKGROUND

This description relates to managing computations for hierarchical entities.

There are a variety of ways in which various entities within a computing environment can represent data that has multiple values. Some computing environments enable vector entities, where a series of values are stored in a data structure as elements of a vector. The vector entity can then be referenced symbolically within expressions by a single symbolic string. Some computing environments, such as spreadsheets, provide an explicit visual representation of a multi-valued entity as a row in a grid or table, or as the grid or table itself. In some computing environments, different entities can have a hierarchical relationship to each other, for example, where one entity can be associated with any number of "child entities" (also called "sub-entities"), and a given child entity can be a "parent entity" to other child entities.

To evaluate an expression representing a computation involving multiple entities, a computing environment may have a notion of "conformability" that determines whether that expression is legal (i.e., the expression can be evaluated without causing an error) or illegal (i.e., the expression cannot be evaluated without causing an error). In particular, conformability may determine whether or not different entities can be operated on in a particular way within an expression. For example, in an expression in which a first vector is being added to a second vector, conformability may require the two vectors to have the same number of elements (in which case the second vector is "conformable" to the first vector).

SUMMARY

In one aspect, in general, a computing system includes a data storage system storing entity data representing a plurality of entities that are related according to a hierarchy, where at least one root entity is at a highest level of the hierarchy and one or more entities are at one or more levels below the highest level of the hierarchy, each entity at a level lower than the root entity is a child entity of a single entity, and one or more entities each have: multiple instances, and at least one attribute that has respective elements for each of the instances. The computing system also includes an input device or port for receiving input data that includes one or more expressions that each express one or more functions of one or more arguments, with one or more of the arguments referencing an attribute of an entity represented in the entity data; and at least one processor configured to process the expressions included in the input data. The processing includes: analyzing an expression to determine, for each of one or more attributes referenced by an argument of the expression, at least one of: (1) a position in the hierarchy of an entity of the attribute, or (2) a number of elements of a result of a function applied to an argument that references the attribute, and evaluating the expression, or indicating an error based on a result of analyzing the expression.

Aspects can include one or more of the following features.

The input data includes a first expression that defines values of one or more elements of a first attribute of a first entity represented in the entity data.

The first expression defines the values of one or more elements of the first attribute with reference to a second attribute of a second entity represented in the entity data.

The processing further includes updating the entity data to represent the values of one or more elements of the first attribute, after evaluating the first expression.

At least one function in at least one expression includes one or more operators operating on two or more operands, with two or more of the operands referencing an attribute of an entity represented by the stored data.

Analyzing the expression further includes determining that the referenced attributes include only one vector-valued referenced attribute and one or more scalar-valued referenced attributes, and evaluating the expression includes replicating the scalar-valued referenced attribute for every element of the vector-valued referenced attribute.

Analyzing the expression further includes: determining that the referenced attributes include multiple vector-valued referenced attributes, and comparing respective positions in the hierarchy of two or more of the vector-valued referenced attributes.

The processing includes indicating an error based on two or more of the vector-valued referenced attributes having different respective positions in the hierarchy.

Said determining a position in the hierarchy of an entity of the attribute includes determining context for the attribute based on a path to the entity of the attribute through a chain of entities related by parent-child relationships starting from the root entity.

Analyzing the expression further includes performing a promotion procedure that includes, for at least a first attribute referenced by an argument of the expression, promoting a context of a second attribute of an entity that is an ancestor of the first entity, where the second attribute is referenced by an argument of the expression, and where promoting the context of the second attribute includes replacing the context of the second attribute with the context of the first attribute.

The processing includes indicating an error based on a first attribute referenced by a first argument of a first expression having a different context from a second attribute referenced by a second argument of the first expression.

Analyzing the expression includes determining, for each of two or more attributes referenced by respective arguments, a position in the hierarchy of an entity of the attribute.

Analyzing the expression includes comparing the determined positions, and indicating an error in response to an incompatibility between at least two of the determined positions with respect to a function being applied to their respective arguments.

Analyzing the expression includes determining, for each of one or more attributes referenced by an argument, a number of elements of a result of a function applied to an argument that references the attribute.

Analyzing the expression includes determining, for at least a first attribute referenced by an argument of an aggregation function, a number of elements of a result of the aggregation function, and in response to the result not corresponding to a scalar value with respect to an entity of the first attribute, repeating application of the aggregation function one or more times until a result corresponds to a scalar value with respect to the entity of the first attribute.

In another aspect, in general, a computing system includes means for storing entity data representing a plurality of entities that are related according to a hierarchy, where at least one root entity is at a highest level of the hierarchy and one or more entities are at one or more levels below the highest level of the hierarchy, each entity at a level lower than the root entity is a child entity of a single entity, and one or more entities each have: multiple instances, and at least one attribute that has respective elements for each of the instances. The computing system also includes means for receiving input data that includes one or more expressions that each express one or more functions of one or more arguments, with one or more of the arguments referencing an attribute of an entity represented in the entity data, and means for processing the expressions included in the input data. The processing includes: analyzing an expression to determine, for each of one or more attributes referenced by an argument of the expression, at least one of: (1) a position in the hierarchy of an entity of the attribute, or (2) a number of elements of a result of a function applied to an argument that references the attribute, and evaluating the expression, or indicating an error based on a result of analyzing the expression.

In another aspect, in general, a method includes storing, in a data storage system, entity data representing a plurality of entities that are related according to a hierarchy, where at least one root entity is at a highest level of the hierarchy and one or more entities are at one or more levels below the highest level of the hierarchy, each entity at a level lower than the root entity is a child entity of a single entity, and one or more entities each have: multiple instances, and at least one attribute that has respective elements for each of the instances. The method also includes receiving, over an input device or port, input data that includes one or more expressions that each express one or more functions of one or more arguments, with one or more of the arguments referencing an attribute of an entity represented in the entity data, and processing, using at least one processor, the expressions included in the input data. The processing includes: analyzing an expression to determine, for each of one or more attributes referenced by an argument of the expression, at least one of: (1) a position in the hierarchy of an entity of the attribute, or (2) a number of elements of a result of a function applied to an argument that references the attribute, and evaluating the expression, or indicating an error based on a result of analyzing the expression.

In another aspect, in general, software is stored in a non-transitory form on a computer-readable medium. The software includes instructions for causing a computing system to store, in a data storage system, entity data representing a plurality of entities that are related according to a hierarchy, where at least one root entity is at a highest level of the hierarchy and one or more entities are at one or more levels below the highest level of the hierarchy, each entity at a level lower than the root entity is a child entity of a single entity, and one or more entities each have: multiple instances, and at least one attribute that has respective elements for each of the instances. The software also includes instructions for causing a computing system to receive, over an input device or port, input data that includes one or more expressions that each express one or more functions of one or more arguments, with one or more of the arguments referencing an attribute of an entity represented in the entity data, and process, using at least one processor, the expressions included in the input data. The processing includes: analyzing an expression to determine, for each of one or more attributes referenced by an argument of the expression, at least one of: (1) a position in the hierarchy of an entity of the attribute, or (2) a number of elements of a result of a function applied to an argument that references the attribute, and evaluating the expression, or indicating an error based on a result of analyzing the expression.

Aspects can include one or more of the following advantages.

The techniques for managing computations enable efficiency and flexibility in defining and evaluating expressions that represent computations on hierarchical entities (i.e., different entities are related to each other according to a hierarchy). In general, the hierarchy can be represented as a graph of vertices connected by directed edges (e.g., a directed acyclic graph (DAG)), where the vertices represent entities, and the edges represent relationships between the entities. Each vertex is at a particular level of the hierarchy. At least one entity (e.g., a "root entity" if the hierarchy has a tree structure) is at a highest level of the hierarchy, and one or more entities are at one or more levels below the highest level of the hierarchy. Each entity at a level lower than the highest level is a child entity of a single parent entity. Entities that do not have any child entities are "leaf entities." Entities that have the same number of generations from the root may be considered to be at the same level of the hierarchy. In some implementations entities are only considered to be at the same level of the hierarchy if they are "siblings" (i.e., have the same parent entity). Generally, as used herein, higher-level entities are closer to the root entity than lower-level entities. (Alternatively, in an equivalent description, the root entity could be considered to be at the lowest level of the hierarchy, and the terms "higher" and "lower" could be interpreted in the opposite manner, such that lower-level entities are closer to the root than higher-level entities.) An analysis module, described in more detail below, is able to efficiently analyze expressions to determine what kind of calculation is to be performed and provide feedback within an expression editor about violations of conformability between hierarchical entities and other potential errors. For computing systems that manage and process hierarchically organized data, it is useful to have a way for computations to be efficiently programmed within a user interface that provides a powerful syntax for defining expressions, but which also includes a mechanism to ensure that errors are not introduced that could affect a potentially large volume of result data. For example, an online commercial transaction processing system (e.g., a computing system coupled to a network and configured to process instances of entities representing the transactions) may enable expressions to reference a variety of different types of transaction values. For example, the transaction values may include: values that correspond to different purchases and values that correspond to different customers; values that correspond to reservations (e.g., for travel, package delivery, etc.); or values that correspond to prices and associated amounts. In such a system, it is useful to support a form of conformability that is flexible enough to allow complex expressions, but also able to detect and prevent subtle errors that could make their way into the results. Other features and advantages of the invention will become apparent from the following description, and from the claims.

DESCRIPTION

Figure 1:
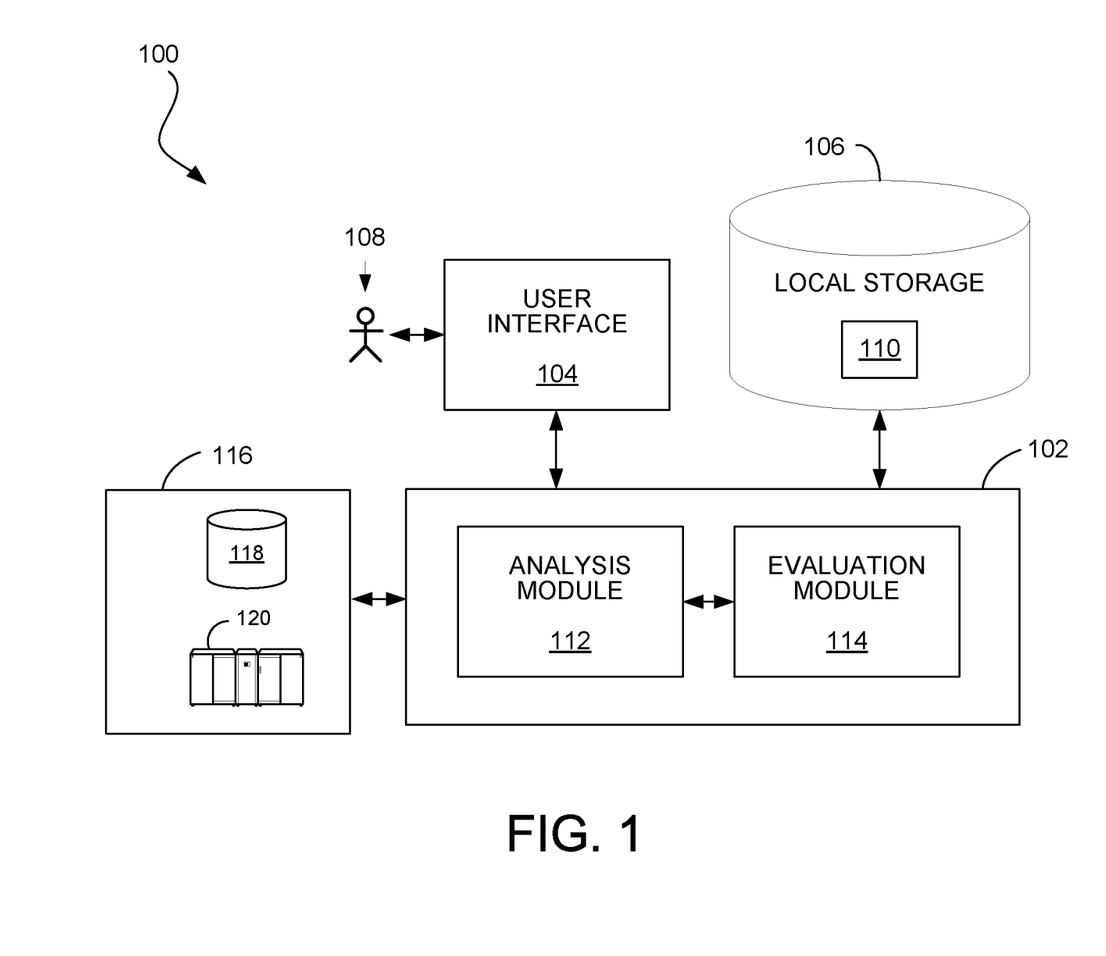
FIG. 1 is a block diagram of a computing system for managing computations involving hierarchical entities.

FIG. 1 shows an example of a computing system 100 in which the computational techniques can be used. The system 100 includes an execution environment 102 that provides a user interface 104, and has local storage 106. A user 108 specifies expressions within the user interface 104, and a representation of those expressions 110 is stored in the local storage 106. The execution environment 102 includes an analysis module 112 for analyzing the expressions 110 (or portions of expressions) to determine if they are legal, and an evaluation module 114 for evaluating expressions (or portions of expressions) that have been confirmed by the analysis module 112 as being legal. Included in an expression is any number of functions of one or more arguments. Some of the arguments may reference an attribute of an entity represented in entity data stored in the local storage 106, or in another accessible location, such as a data storage system 116 in communication with the execution environment 102.

The execution environment 102 may be hosted, for example, on one or more general-purpose computers under the control of a suitable operating system, such as a version of the UNIX operating system. For example, the execution environment 102 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The data storage system 116 may include one or more storage devices or connections to online data streams or online services, each of which may store or provide data in any of a variety of formats (e.g., database tables, spreadsheet files, flat text files, or a native format used by a mainframe). Storage devices providing the data storage system 116 may be local to the execution environment 102, for example, being stored on a storage medium connected to a computer hosting the execution environment 102 (e.g., hard drive 118), or may be remote to the execution environment 102, for example, being hosted on a remote system (e.g., mainframe 120) in communication with a computer hosting the execution environment 102, over a remote connection (e.g., provided by a cloud computing infrastructure). Analysis of the expressions 110 by the analysis module 112, or evaluation of the expressions 110 by the evaluation module 114, may be initiated in response to explicit user input or other forms of input such as a service request. The service request may include entity data representing hierarchical entities, or references to such entity data. For example, a service request in encoded in XML may contain hierarchical entity data, or a service request may reference entity data stored in the data storage system 116.

The data stored in the local storage 106 or data storage system 116 includes some data that can be referenced within expressions as hierarchical entities. An entity can be regarded as an abstraction of a collection of any number of items of a particular kind, in an information domain, which are capable of independent existence or can be uniquely identified. For example, a "Customer" entity may be represented by a table in a database, or by a dataset stored as a file (e.g., with delimited records). Individual records (or "rows") in the database table or dataset file may each represent a different instance of the Customer entity representing a different customer of a company, for example, in a system that manages commercial data. An entity can also be represented by any other type of data structure such as a collection of data objects of a particular class, where different instances of the entity correspond to different instances of the data object.

Each entity may have any number of attributes. For example, in an entity represented by a database table, the fields (or "columns") of the table can be defined for storing a particular type of data (e.g., a variable with a predetermined data type) corresponding to a particular attribute of that entity. A table for a Customer entity, for example, may include fields for storing values associated with an instance of the Customer entity, each of which is represented by a different record in the table. For a particular instance of an entity, any of its attributes can have a particular value (including a scalar value or a vector or sub-record of values), or can have a null value or be left empty. Whether an attribute of an entity is considered to be a scalar or a vector corresponds to the number of instances of the entity that exist. So, in the example of an entity represented by a table, if the table had a single row, each field would represent a scalar-valued attribute for that entity. If the table had multiple rows, each field would represent an element of the vector-valued attribute for that entity, where the number of elements in each vector (i.e., the length of the vector) is equal to the number of rows in the table.

Each entity may also have any number of child entities. A child entity can itself have any number of instances for each instance of the parent entity (unlike a sub-record, which just has a single instance for a particular instance of an entity). The hierarchical parent-child relationships between different entities can be formed in any of a variety of ways. In some implementations, the parent-child relationships can be formed using a field in a table for a child entity that stores a foreign key value corresponding to a row in a table for a parent entity. In other implementations, the parent-child relationships can be formed using pointers between data structures representing parent and child entities, or there may be a nesting of data structures representing child entities embedded within a data structure representing a parent entity. Each child entity has a particular path through a chain of entities related by parent-child relationships starting from the root entity (also called its "context," which specifies its position in the hierarchy). At the lowest level of the hierarchy are leaf entities, which do not have any child entities. Each entity is either a leaf entity or a parent entity.

To allow different instances of an entity to be uniquely identified, one or more attributes of the entity may be identified as "key attributes" that are part of a unique key for the entity. In some cases, an entity has a single key attribute. For example, a field labeled "Custid" may store a value that is unique for each record that represents an instance of the Customer entity. Such a single key field is sometimes called a "simple key." In some cases, an entity has multiple key attributes that together form a unique key (also called a "compound key"). For example, the combination (e.g., concatenation) of fields "first name," "last name," and "SSN" may act as key attributes that together uniquely identify a record that represents an instance of the Accounts entity. There may be multiple fields with unique values (also called "candidate keys"), and one of those fields (or a combination of fields) may be selected for use as the unique key that will be used (also called a "primary key"). Sometimes a field is added to a record to store a value that will act as part of a unique key (also called a "surrogate key").

Figure 2A:
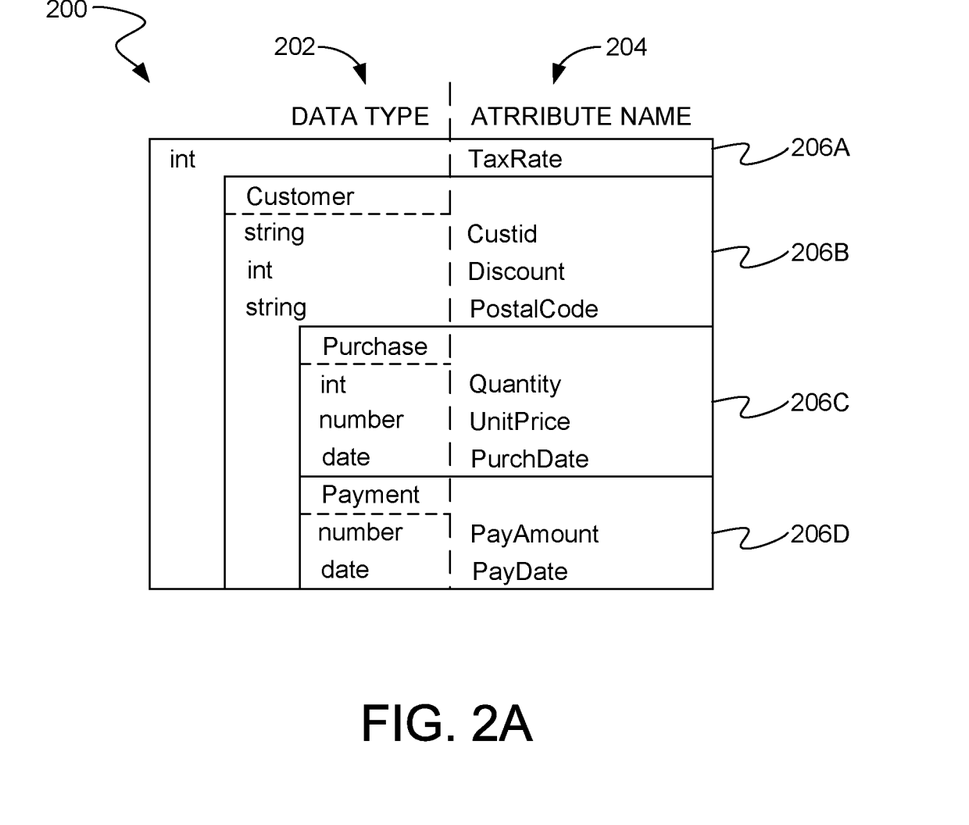
FIGS. 2A and 2B are examples of user interfaces for defining and viewing entities.

The user interface 104 may be presented as a graphical user interface on a display screen. FIG. 2A shows an example of a visual arrangement of a user interface 200 that can be rendered to enable the user 108 to define and view the entities and their relationships to each other within a hierarchy. The user interface 200 includes: (1) a left portion 202 that includes headings naming different entities defined in separate indented sections that include a list of attribute data types, and (2) a right portion 204 that includes attribute names aligned with corresponding data types. In some implementations, a root entity is provided that has a single instance with attributes that serve as global variables that are accessible to all other entities in the hierarchy. In this example, a root entity defined in a section 206A is provided that lists a single attribute named "TaxRate" with a type "int" (i.e., integer). The root entity has a single child entity named "Customer" defined in a section 206B. The Customer entity also has three attributes: "Custid" (of type "string"), "Discount" (of type "int"), and "PostalCode" (of type "string").

The indentation of a section corresponds to the level of the corresponding entity in the hierarchy (i.e., any sections indented by the same amount are at the same level in the hierarchy). Any number of contiguous sections that are indented by the same amount and located below a section for a particular entity define entities that are children of that particular entity. In this example, the Customer entity has two child entities: (1) an entity named "Purchase" defined in section 206C, and (2) an entity named "Payment" defined in section 206D. The Purchase entity has three attributes: "Quantity" (of type "int"), "UnitPrice" (of type "number"), and "PurchDate" (of type "date"). The Payment entity has two attributes: "PayAmount" (of type "number"), and "PayDate" (of type "date").

An entity key can be assigned to each entity, either automatically by the system assigning a surrogate key, or by a user designating one or more attributes to for a primary key (e.g., Custid as the entity key for the Customer entity). If a user designates an attribute to be used as an entity key that is not unique, then the system can indicate that as an error. If the user does not designate an attribute as an entity key, a surrogate entity key can be generated by default for each instance in a way that guarantees that entity key is unique within a space of key values associated with a particular instance of the parent entity. This surrogate entity key may be hidden from the user, or explicitly included in the user interface 200 as a declared attribute (e.g., with the name "SurrogateKey") allowing the user to refer to the surrogate entity key within expressions. If an entity is specified as being "indexed," then the entity keys can be assigned as consecutive integers starting at 0 and increasing (i.e., without any gaps), so instances of the entity can be referenced using a syntax such as Customer[i], where i is the integer value of the entity key. Additionally, if an entity has the property of being ordered, one of the attributes that has a well-defined order can be designated as providing the order. The order can be a complete ordering using a key that has unique values (e.g., by Custid for the Customer entity), or the order can be a partial ordering (e.g., by PostalCode for the Customer entity).

Figure 2B:
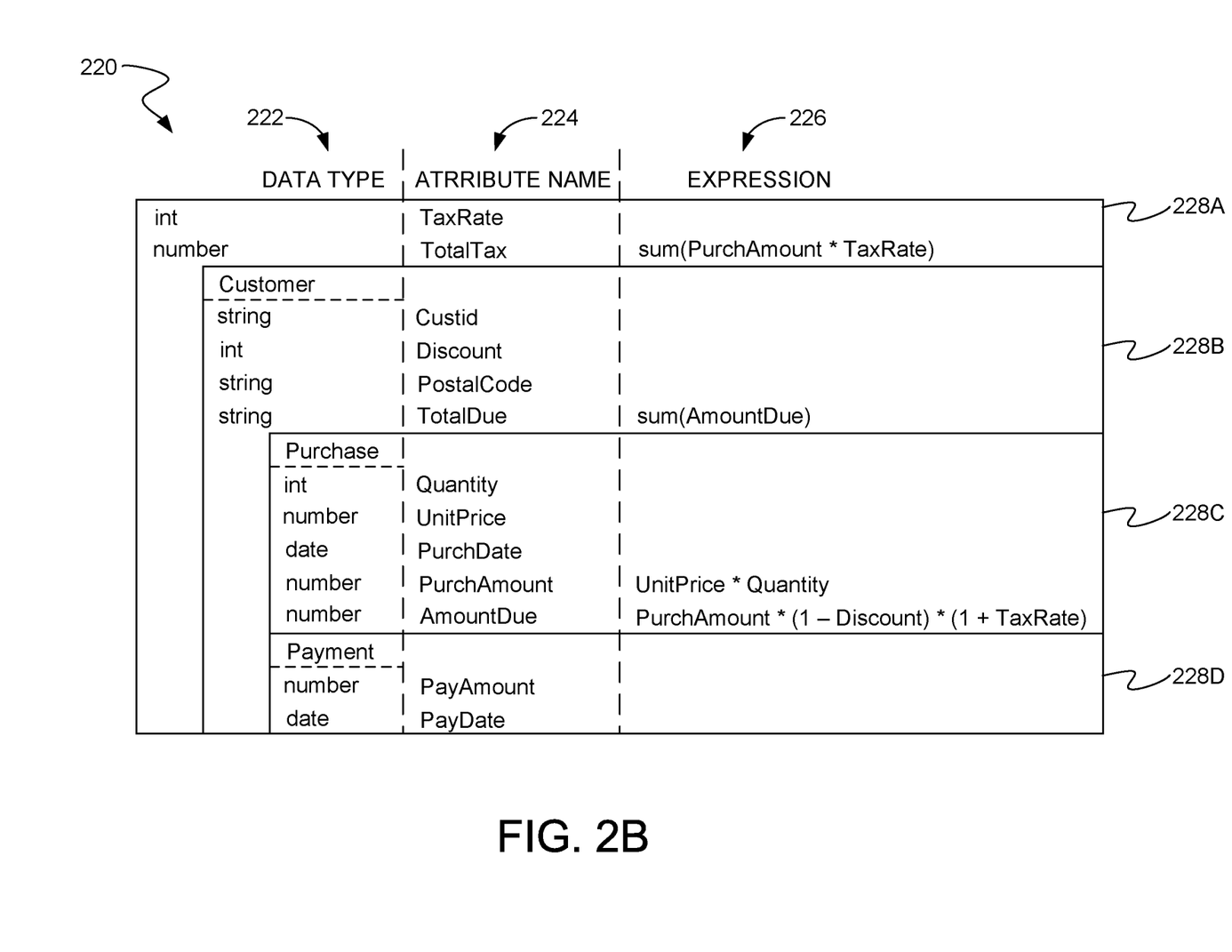

FIG. 2B shows an example of a visual arrangement of a user interface 220 that can be rendered to enable the user 108 to define expressions for certain attributes (in addition to defining and view the entities and their relationships to each other within the hierarchy, as in FIG. 2A). For purposes of illustration, the user interface 220 in this example includes sections 228A-228D for entities similar to entities in corresponding sections 206A-206D of the previous example. The user interface 220 includes: (1) a left portion 222 that includes headings naming different entities defined in separate indented sections that include a list of attribute data types, and (2) a middle portion 224 that includes attribute names aligned with corresponding data types, and (3) a right portion 226 that includes expressions for any attributes that are defined in terms of the value(s) of other attribute(s). An attribute that has been defined using such an expression is called a "defined attribute" and instances of the corresponding entity will have a value for that defined attribute that is computed according to the provided expression. For example, the value of a defined attribute may be computed, or re-computed, at when a computation involving various entities is evaluated. An attribute that does not have such an expression is called a "concrete attribute" and instances of the corresponding entity will be provided a value directly without reference to any other attributes. If more than one attribute is referenced in an expression, the analysis module 112 determines whether those "referenced attributes" are conformable, as described in more detail below. In this example, the root entity, the Customer entity, and the Purchase entity have been provided defined attributes that are defined using expressions that reference other attributes, in addition to the concrete attributes of the previous example.

The analysis module 112 is able to identify any number of functions that must be applied to any number of arguments within an expression. For example, an expression may include a single function applied to a set of arguments, or a composition of functions applied to results of other functions. As used herein, the term "function" is used broadly and may refer to any operation applied to any number of operands, which are the arguments of the function, or may refer to any computation defined to take any number of arguments (including no arguments) as input, even if that function is not a fixed operation. Examples of the types of operations that may be supported for use within expressions include unary, binary, and ternary operators of various programming languages (e.g., addition, subtraction, multiplication, division, modulus, left or right shift), various tests for equality or inequality, application of scalar-valued operations (e.g., exponentials, logarithms). Additionally, a programming language may be provided to allow a user to define any custom function that the user may want to use within an expression.

After the user 108 provides an expression defining how the value of a defined attribute is to be computed, the analysis module 112 analyzes the expression to determine whether the expression is legal or illegal. In addition to conformability (or lack thereof), other errors or inconsistencies can be recognized by the analysis module 112. A referenced attribute can be either a concrete attribute or a defined attribute, but if it is a defined attribute, there should not be any circular references. For example, if an expression defining a first attribute references a second attribute, that second attribute should not be defined by an expression that references the first attribute (i.e., a circular reference).

An expression defining an attribute of a first entity may reference an attribute of a second entity that is an "ancestor entity" of the first entity, which means that it is within a chain of parent-child relationships between the first entity and the root entity. For example, the expression for Amount- Due references the attribute Discount (from the Customer entity) and attribute TaxRate (from the root entity). There will be a particular instance of that ancestor entity whose attribute value is being referenced. Attributes of the single instance of the root entity have the same value within any expression for any attribute of any entity in the hierarchy. An expression can also include references to different attributes at different levels, such as the expression for AmountDue, which references PurchAmount at the same level as the defined attribute, Discount one level up, and TaxRate two levels up.

Some referenced attributes are vector-valued attributes with values that come from multiple instances of their respective entities. One type of operation that can be applied to such vector valued-attributes is an aggregation operation that operates over the elements of the vector representing all of that attribute's values (contained in respective instances of that attribute's entity). In some cases, an aggregation operation produces a scalar result. For example, the expression for TotalDue is sum(AmountDue), which, for a particular instance of the Customer entity, adds the values of AmountDue across the instances of the child Purchase entity, producing a scalar result for that particular instance of the Customer entity. More generally, an aggregation operation can be thought of as removing the last entity in the context, which provides a result that is up one level in the hierarchy from the level of the vector being aggregated. The expression for the TotalTax attribute of the root entity includes a sum with a summand that is the product of TaxRate and PurchAmount (a grandchild of the root entity). So, the values of Purchase are summed over the instances of the Purchase entity, and the result is a vector over the instances of the Customer entity (a child of the root entity).

Alternatively, some aggregation operations may recursively operate on the operands until a scalar result is achieved with respect to a particular instance of the corresponding entity. For example, the values of the vector-valued result in the above sum could be summed providing a scalar as the value of the TotalTax attribute. This recursive aggregation may be performed, for example, in certain implementations that require attributes to be scalar-valued with respect to their entity.

Another type of operation that can be applied to vector-valued attributes, operating over all of that attribute's values, is one that returns a vector-valued result. For example, an operation called running_sum(<vector>) is defined as an operation that produces the partial sums of the elements of <vector> between the start of <vector> and the current element. So, an expression that included running_sum({1, 2, 3, 4}) would produce the resulting vector {1, 3, 6, 10}. In implementations that require attributes to be scalar-valued with respect to their entity, such an operation would still need to further operations to be applied to achieve a scalar result.

The expressions provided within the user interface 220 are implicitly ordered based on the dependencies between attribute definitions and attribute references. This order is not constrained by the spatial order within the user interface 220. For example, the definition of TotalDue references AmountDue, which is legal because there are no circular definitions. It does not matter that AmountDue is defined lower down in the user interface 220. A topological sort can be used to determine a partial ordering for constraining the order in which expressions for defined attributes are evaluated. The topological sort can also be used to ensure that there are no circular references.

There are a variety of ways that an attribute can be uniquely referenced within an expression. If an attribute name is unique, some implementations of the analysis module 112 can be configured to recognize that attribute only by its name. Another way that an attribute can be uniquely referenced, even if attributes of different entities have the same name (assuming sibling entities have unique names), is by including that attribute's context within the expression. For example, a "dot notation" can be used to provide a "qualified name" in which each entity in the context is named, starting with a child of the root entity, and including a dot ('.') after each entity name until the entity of the desired attribute is reached. For example, the PurchDate attribute can be referenced by the qualified name Customer.Purchase.PurchDate in an expression, without ambiguity, even if another entity had an attribute called PurchDate. In some implementations, a potentially ambiguous "non-qualified" name (i.e., just an attribute name without a context) of an attribute could be interpreted as belonging to the same entity as the entity in which the expression containing the non-qualified name appeared. For example, if Purchase had an attribute called Amount (instead of PurchAmount) and Payment had an attribute called Amount (instead of PayAmount), then a reference to Amount in AmountDue would automatically be interpreted as belonging to Purchase and not to Payment. However, the reference appearing in the attribute TotalTax would need to include the qualified name Customer.Purchase.Amount (instead of PurchAmount). In some cases, it may be useful to refer to an entity itself without specifying any of its attributes, in which case a special notation can be used such as "Customer[ ]" to refer to the entity named "Customer." This notation can also be used to select particular elements of a vector of attribute values. For example, Customer.Discount is a vector over the instances of the Customer entity, and Customer[5].Discount is the scalar value of the Discount attribute for the $5^{th}$ instance of the Customer entity.

The determination of whether an expression is legal or illegal is based on whether referenced attributes are scalars or vectors, and based on conformability of referenced vector attributes. Each entity can have any number of concrete attributes and any number of defined attributes. Each attribute (concrete or defined) of an entity will have a respective value for each instance of that entity. So, with respect to a particular instance of a first entity a first attribute may be a scalar (having a single value), but with respect to an instance of an ancestor of the first entity, the first attribute may be a vector (having multiple values—one for each instance of the first entity). Therefore, a reference to an attribute of a child entity, in an expression for a defined attribute of the parent entity, is a vector over the instances of that child entity. In some implementations, the result of evaluating an expression is required to be a scalar with respect to a particular instance of the entity whose attribute is being defined by that expression. So, an expression may include aggregation operations (e.g., sum, max) operating on the elements of these vectors.

One example of a procedure that the system 100 uses to ensure conformability includes one or more phases of analysis (performed by the analysis module 112) followed by evaluation (performed by the evaluation module 114). This procedure may include an initial step in which the context of certain attributes appearing in the expression is "promoted." For example, the qualified name Customer.Purchase.AmountDue has a context of Customer.Purchase for the defined attribute AmountDue. This context of the defined attribute will be used in the promotion procedure. The attributes to be promoted are the attributes of ancestor entities of the defined attribute. So, in this example, the attributes TaxRate and Customer.Discount will be promoted. An attribute is promoted by replacing its context with that of the defined attribute to generate a "promoted name," which in this example yields: Customer.Purchase.TaxRate and Customer.Purchase.Discount. Any ambiguities that would be caused by any existing attributes with the same names as those being promoted can be resolved in a variety of ways, such as by adding temporary a prefix or postfix to the attribute names.

After the promotion step, the analysis module 112 determines whether the expression includes an operation to be performed on two or more referenced attributes that are vectors. If so, then for each such multi-vector operation, the analysis module 112 checks the conformability of the vector-valued referenced attributes. With respect to the instance of the entity of the defined attribute, any promoted attributes of ancestor entities, or any attributes of the same entity as the defined attribute itself, will have a scalar value that comes from a particular instance of their respective entities. Whereas, attributes of any non-ancestor entities (i.e., descendent entities or cousin entities) may potentially have a vector of values that come from multiple instances of their respective entities. So it is these non-ancestor entities that may need to be checked for conformability.

The next step in determining whether two or more vector-valued referenced attributes are conformable is to compare their contexts. In some implementations, the comparison is performed once for each unique pair of the two or more attributes. For each pair, the analysis module 112 determines if the (potentially promoted) contexts are identical, or if one is a prefix of the other. If either of these conditions is true, then the pair of referenced attributes are conformable. If neither of these conditions is true, then the pair of referenced attributes are not conformable. The entire set of referenced attributes is conformable if they are all pairwise conformable with each other. If the analysis module 112 determines that the referenced attributes are conformable, the evaluation module 114 evaluates the expression, or the portion of the expression containing the operation on those referenced attributes. Otherwise, the system 100 indicates a conformability error based on a result of the conformability analysis (e.g., as a visual indicator within the user interface 220). In some implementations, a result of an operation on two or more conformable vector-valued attributes inherits the longest of the contexts as its own context.

The analysis module 112 does not need to check for conformability in the case of an operation that operates on a mix of a vector-valued referenced attribute and a scalar-valued referenced attribute. For example, an addition operation can sum a vector and a scalar by adding that scalar to every element of the vector (i.e., for every instance of an attribute's entity). For some operations, a mix of scalar-valued and vector-valued attributes may not be allowed as operands, and may lead to the analysis module identifying an expression as being illegal.

Figure 3:
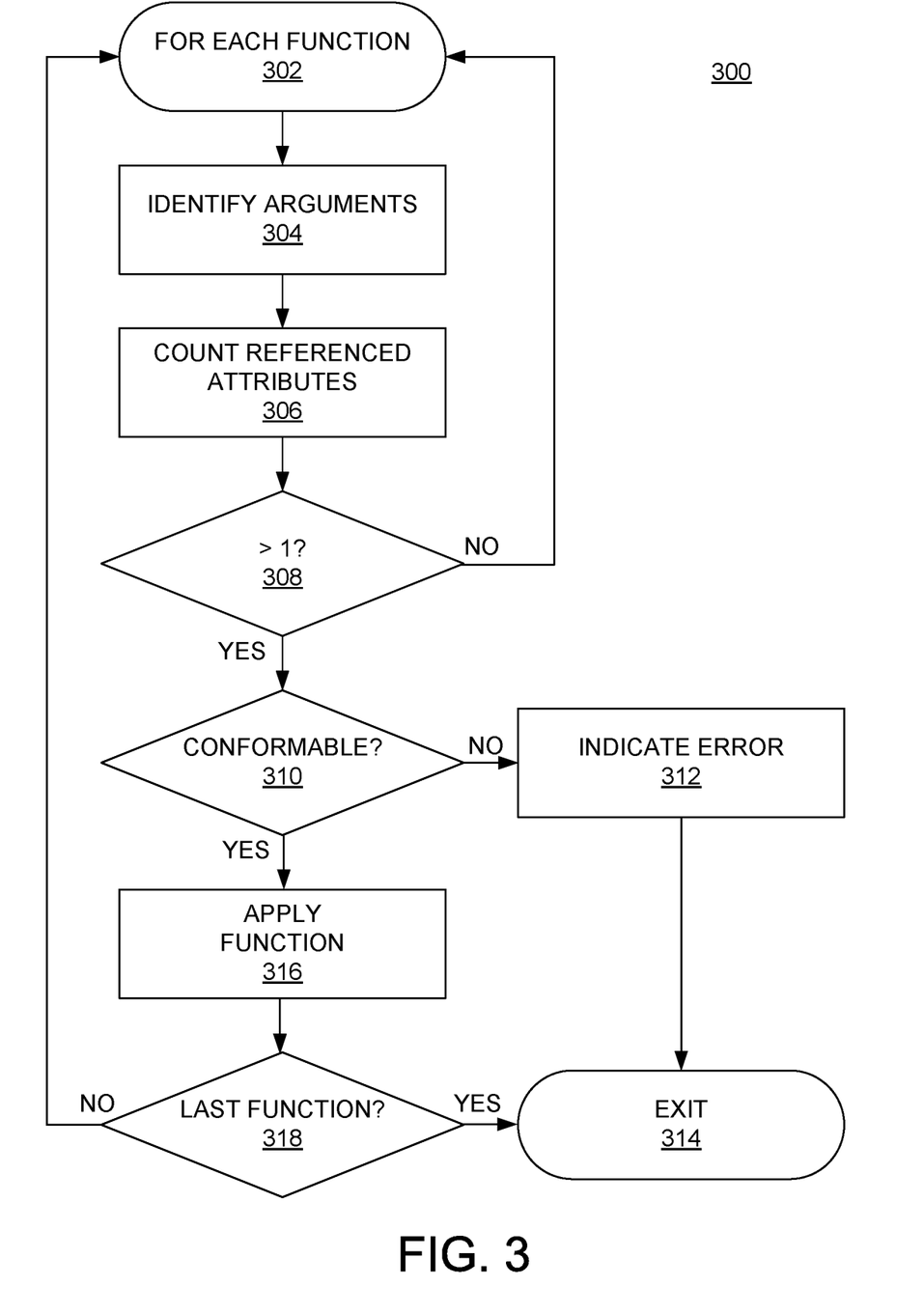
FIG. 3 is a flowchart of conformability checking procedure.

FIG. 3 shows a flowchart of an example of a conformability checking procedure 300 that may be performed by the system 100. In this example, the procedure 300 is implemented as a for-loop over potentially multiple functions to be evaluated within an expression. There may be steps performed before or after the for-loop (not shown), and other analysis and/or evaluation steps may be performed in addition to this procedure 300 in various implementations. Using a for-loop, the analysis module 112 can incrementally analyze the arguments of those functions to check for conformability before the functions are applied (by the evaluation module 114). The for-loop iterates (302) through one or more functions represented within an expression. For each identified function, the procedure 300 identifies (304) all of that function's arguments. The procedure counts (306) the number of those arguments that include a referenced attribute. If there is more than one referenced attribute, then the procedure 300 performs a conformability check (310) by comparing the contexts of those multiple referenced attributes. If there is not more than one referenced attribute (i.e., 0 or 1 referenced attributes), then the procedure loops back to the beginning of the for-loop without performing the conformability check (310). If the referenced attributes are not conformable, then the procedure 300 indicates an error (312), and then exits (314) the for-loop. If the referenced attributes are conformable, then the procedure 300 applies the function (316). The loop condition checks (318) whether the function that was just applied is the last function to be applied in the expression. If so, the procedure 300 exits (314) the for-loop. If not, the procedure 300 loops back to the beginning of the for-loop.

Various kinds of aggregation or selection operations may be supported for use within expressions to produce scalar values from vectors, which can then be operated on with other scalar values. For example, one kind of operation filters a vector using the following syntax: <vector> where <condition>. It is assumed that the condition will only be true for a single element of the vector. For this and other operators, the evaluation module 114 is able to verify at runtime that an operation produces a scalar result, and if not can produce an error.

Various restrictions can be placed on entities in some implementations. In some cases, those restrictions affect the context, and therefore the conformability, of the entities. For example, an entity can have a child entity that is not allowed to have multiple instances, but the single instance of that child entity can have its own attributes. The context for such a child entity is the same as the context of its parent (i.e., the scalar child entity is treated as an attribute).

In some implementations, an entity is allowed to be defined as a function of other entities (like an attribute can be defined as a function of other attributes). For example, an entity can be defined as a union, join, group by, or rollup (or other relational operations) of other entities. The various functions can have rules for determining the context of the result.

The approaches to managing computations for hierarchical entities described above can be implemented using a computing system executing suitable software, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computing system including:
   a data storage system storing entity data representing a plurality of entities that are related according to a hierarchy, where at least one root entity is at a highest level of the hierarchy and one or more entities are at one or more levels below the highest level of the hierarchy, each entity at a level lower than the root entity is a child entity of a single entity, and one or more entities each including: multiple instances, and at least one attribute that has respective elements for each of the instances;
   an input device or port for receiving input data that includes one or more expressions that each express one or more functions of one or more arguments, with one or more of the arguments referencing an attribute of an entity represented in the entity data; and
   at least one processor configured to process the expressions included in the input data, the processing including:
      analyzing an expression to determine, for each of one or more attributes referenced by an argument of the expression, at least one of: (1) a position in the hierarchy of an entity of the attribute, or (2) a number of elements of a result of a function applied to an argument that references the attribute,
      wherein the analyzing includes determining, when the expression includes two or more attributes, whether each pair of the two or more attributes are conformable, wherein a pair of attributes are determined to be conformable when analyzing the expression does not determine an error, and
      evaluating the expression, or indicating an expression error, based on a result of analyzing the expression.

2. The computing system of claim 1, wherein determining whether each pair of the two or more attributes are conformable includes:
   determining whether one context of one attribute of the each pair of the two or more attributes is identical to another context of another attribute of the each pair of the two or more attributes, or determining whether the one context of the one attribute is a prefix of the other context of the other attribute, wherein the one context defines an entity path between a root entity of the hierarchy to the one attribute to represent a first position of the one attribute in the hierarchy, and the other context defines another entity path between the root entity to the other attribute to represent another position of the other attribute in the hierarchy.

3. The computing system of claim 1, wherein determining whether each pair of the two or more attributes are conformable includes:
   determining, in response to a first determination that a first attribute and a second attribute of a pair of attributes are vectors, whether a vector operation within the expression applied to the first and second vector attributes does not result in an vector-operation error.

4. The computing system of claim 1, wherein evaluating the expression, or indicating the expression error based on the result of analyzing the expression comprises: evaluating the expression upon determination of conformability of the two or more attributes of the expression, or exiting the processing and indicating the expression error based on a determination that attributes of at least one pair of the two or more attributes are not conformable.

5. The computing system of claim 1, wherein the input data includes a first expression that defines values of one or more elements of a first attribute of a first entity represented in the entity data.

6. The computing system of claim 5, wherein the first expression defines the values of one or more elements of the first attribute with reference to a second attribute of a second entity represented in the entity data.

7. The computing system of claim 6, wherein the processing further includes updating the entity data to represent the values of one or more elements of the first attribute, after evaluating the first expression.

8. The computing system of claim 1, wherein at least one function in at least one expression includes one or more operators operating on two or more operands, with two or more of the operands referencing an attribute of an entity represented by the stored data.

9. The computing system of claim 8, wherein analyzing the expression further includes determining that the referenced attributes include only one vector-valued referenced attribute and one or more scalar-valued referenced attributes, and evaluating the expression includes replicating the scalar-valued referenced attribute for every element of the vector-valued referenced attribute.

10. The computing system of claim 8, wherein analyzing the expression further includes: determining that the referenced attributes include multiple vector-valued referenced attributes, and comparing respective positions in the hierarchy of two or more of the vector-valued referenced attributes.

11. The computing system of claim 8, wherein the processing further includes indicating the expression error based on two or more of the vector-valued referenced attributes having different respective positions in the hierarchy.

12. The computing system of claim 1, wherein determining the position in the hierarchy of the entity of the attribute includes determining context for the attribute based on a path to the entity of the attribute through a chain of entities related by parent-child relationships starting from the root entity.

13. The computing system of claim 12, wherein analyzing the expression further includes performing a promotion procedure that includes, for at least a first attribute referenced by an argument of the expression, promoting a context of a second attribute of an entity that is an ancestor of the first entity, where the second attribute is referenced by an argument of the expression, and where promoting the context of the second attribute includes replacing the context of the second attribute with the context of the first attribute.

14. The computing system of claim 13, wherein the processing further includes indicating the expression error based on a first attribute referenced by a first argument of a first expression having a different context from a second attribute referenced by a second argument of the first expression.

15. The computing system of claim 1, wherein analyzing the expression includes determining, for at least a first attribute referenced by an argument of an aggregation function, a number of elements of a result of the aggregation function, and in response to the result not corresponding to a scalar value with respect to an entity of the first attribute, repeating application of the aggregation function one or more times until a result corresponds to a scalar value with respect to the entity of the first attribute.

16. A method including:
    storing, in a data storage system, entity data representing a plurality of entities that are related according to a hierarchy, where at least one root entity is at a highest level of the hierarchy and one or more entities are at one or more levels below the highest level of the hierarchy, each entity at a level lower than the root entity is a child entity of a single entity, and one or more entities each have: multiple instances, and at least one attribute that has respective elements for each of the instances;
    receiving, over an input device or port, input data that includes one or more expressions that each express one or more functions of one or more arguments, with one or more of the arguments referencing an attribute of an entity represented in the entity data; and
    processing, using at least one processor, the expressions included in the input data, the processing including:
        analyzing an expression to determine, for each of one or more attributes referenced by an argument of the expression, at least one of: (1) a position in the hierarchy of an entity of the attribute, or (2) a number of elements of a result of a function applied to an argument that references the attribute,
        wherein the analyzing comprises determining, when the expression includes two or more attributes, whether each pair of the two or more attributes are conformable, wherein a pair of attributes are determined to be conformable when analyzing the expression does not determine an error, and
        evaluating the expression, or indicating an expression error based on a result of analyzing the expression.

17. The method of claim 16, wherein determining whether each pair of the two or more attributes are conformable comprises:
    determining whether one context of one attribute of the each pair of the two or more attributes is identical to another context of another attribute of the each pair of the two or more attributes, or determining whether the one context of the one attribute is a prefix of the other context of the other attribute, wherein the one context defines an entity path between a root entity of the hierarchy to the one attribute to represent a first position of the one attribute in the hierarchy, and the other context defines another entity path between the root entity to the other attribute to represent another position of the other attribute in the hierarchy.

18. The meth system of claim 16, wherein determining whether each pair of the two or more attributes are conformable includes:
    determining, in response to a first determination that a first attribute and a second attribute of a pair of attributes are vectors, whether a vector operation within the expression applied to the first and second vector attributes does not result in an vector-operation error.

19. The method of claim 16, wherein evaluating the expression, or indicating the expression error based on the result of analyzing the expression comprises: evaluating the expression upon determination of conformability of the two or more attributes of the expression, or exiting the processing and indicating the expression error based on a determination that attributes of at least one pair of the two or more attributes are not conformable.

20. The method of claim 16, wherein at least one function in at least one expression includes one or more operators operating on two or more operands, with two or more of the operands referencing an attribute of an entity represented by the stored data.

21. The method of claim 20, wherein analyzing the expression further includes one or more of:
    determining that the referenced attributes include only one vector-valued referenced attribute and one or more scalar-valued referenced attributes, and evaluating the expression includes replicating the scalar-valued referenced attribute for every element of the vector-valued referenced attribute; or
    determining that the referenced attributes include multiple vector-valued referenced attributes, and comparing respective positions in the hierarchy of two or more of the vector-valued referenced attributes.

22. The method of claim 20, wherein the processing further includes indicating the expression error based on two or more of the vector-valued referenced attributes having different respective positions in the hierarchy.

23. The method of claim 16, wherein determining the position in the hierarchy of the entity of the attribute includes determining context for the attribute based on a path to the entity of the attribute through a chain of entities related by parent-child relationships starting from the root entity.

24. The method of claim 23, wherein analyzing the expression further includes performing a promotion procedure that includes, for at least a first attribute referenced by an argument of the expression, promoting a context of a second attribute of an entity that is an ancestor of the first entity, where the second attribute is referenced by an argument of the expression, and where promoting the context of the second attribute includes replacing the context of the second attribute with the context of the first attribute.

25. The method of claim 16, wherein analyzing the expression includes determining, for at least a first attribute referenced by an argument of an aggregation function, a number of elements of a result of the aggregation function, and in response to the result not corresponding to a scalar value with respect to an entity of the first attribute, repeating application of the aggregation function one or more times until a result corresponds to a scalar value with respect to the entity of the first attribute.

26. Software stored in a non-transitory form on a computer-readable medium, the software including instructions for causing a computing system to:
   store, in a data storage system, entity data representing a plurality of entities that are related according to a hierarchy, where at least one root entity is at a highest level of the hierarchy and one or more entities are at one or more levels below the highest level of the hierarchy, each entity at a level lower than the root entity is a child entity of a single entity, and one or more entities each have: multiple instances, and at least one attribute that has respective elements for each of the instances;
   receive, over an input device or port, input data that includes one or more expressions that each express one or more functions of one or more arguments, with one or more of the arguments referencing an attribute of an entity represented in the entity data; and
   process, using at least one processor, the expressions included in the input data, the processing including:
      analyzing an expression to determine, for each of one or more attributes referenced by an argument of the expression, at least one of: (1) a position in the hierarchy of an entity of the attribute, or (2) a number of elements of a result of a function applied to an argument that references the attribute,
      wherein the analyzing comprises determining, when the expression includes two or more attributes, whether each pair of the two or more attributes are conformable, wherein a pair of attributes are determined to be conformable when analyzing the expression does not determine an error, and
      evaluating the expression, or indicating an expression error based on a result of analyzing the expression.

27. The software of claim 26, wherein determining whether each pair of the two or more attributes are conformable comprises:
   determining whether one context of one attribute of the each pair of the two or more attributes is identical to another context of another attribute of the each pair of the two or more attributes, or determining whether the one context of the one attribute is a prefix of the other context of the other attribute, wherein the one context defines an entity path between a root entity of the hierarchy to the one attribute to represent a first position of the one attribute in the hierarchy, and the other context defines another entity path between the root entity to the other attribute to represent another position of the other attribute in the hierarchy.

28. The software of claim 26, wherein determining whether each pair of the two or more attributes are conformable includes:
   determining, in response to a first determination that a first attribute and a second attribute of a pair of attributes are vectors, whether a vector operation within the expression applied to the first and second vector attributes does not result in an vector-operation error.

29. The software of claim 26, wherein evaluating the expression, or indicating the expression error based on the result of analyzing the expression comprises: evaluating the expression upon determination of conformability of the two or more attributes of the expression, or exiting the processing and indicating the expression error based on a determination that attributes of at least one pair of the two or more attributes are not conformable.

30. The software of claim 26, wherein at least one function in at least one expression includes one or more operators operating on two or more operands, with two or more of the operands referencing an attribute of an entity represented by the stored data.

31. The software of claim 30, wherein analyzing the expression further includes one or more of:
   determining that the referenced attributes include only one vector-valued referenced attribute and one or more scalar-valued referenced attributes, and evaluating the expression includes replicating the scalar-valued referenced attribute for every element of the vector-valued referenced attribute; or
   determining that the referenced attributes include multiple vector-valued referenced attributes, and comparing respective positions in the hierarchy of two or more of the vector-valued referenced attributes.

32. The software of claim 30, wherein the processing further includes indicating the expression error based on two or more of the vector-valued referenced attributes having different respective positions in the hierarchy.

33. The software of claim 26, wherein determining the position in the hierarchy of the entity of the attribute includes determining context for the attribute based on a path to the entity of the attribute through a chain of entities related by parent-child relationships starting from the root entity.

34. The software of claim 33, wherein analyzing the expression further includes performing a promotion procedure that includes, for at least a first attribute referenced by an argument of the expression, promoting a context of a second attribute of an entity that is an ancestor of the first entity, where the second attribute is referenced by an argument of the expression, and where promoting the context of the second attribute includes replacing the context of the second attribute with the context of the first attribute.

35. The software of claim 26, wherein analyzing the expression includes determining, for at least a first attribute referenced by an argument of an aggregation function, a number of elements of a result of the aggregation function, and in response to the result not corresponding to a scalar value with respect to an entity of the first attribute, repeating application of the aggregation function one or more times until a result corresponds to a scalar value with respect to the entity of the first attribute.

36. A computing system including:
   means for storing entity data representing a plurality of entities that are related according to a hierarchy, where at least one root entity is at a highest level of the hierarchy and one or more entities are at one or more levels below the highest level of the hierarchy, each entity at a level lower than the root entity is a child entity of a single entity, and one or more entities each have: multiple instances, and at least one attribute that has respective elements for each of the instances;
   means for receiving input data that includes one or more expressions that each express one or more functions of one or more arguments, with one or more of the arguments referencing an attribute of an entity represented in the entity data; and means for processing the expressions included in the input data, the processing including:

analyzing an expression to determine, for each of one or more attributes referenced by an argument of the expression, at least one of: (1) a position in the hierarchy of an entity of the attribute, or (2) a number of elements of a result of a function applied to an argument that references the attribute, wherein the analyzing comprises determining, when the expression includes two or more attributes, whether each pair of the two or more attributes are conformable, wherein a pair of attributes are determined to be conformable when analyzing the expression does not determine an error, and evaluating the expression, or indicating an expression error based on a result of analyzing the expression.

* * * * *